(12) United States Patent
Hirano

(10) Patent No.: US 7,941,145 B2
(45) Date of Patent: May 10, 2011

(54) ADDRESS REGISTRATION CONTROL DEVICE

(75) Inventor: Jun Hirano, Kanagawa (JP)

(73) Assignee: Panasonic Corporation, Osaka (JP)

(*) Notice: Subject to any disclaimer, the term of this patent is extended or adjusted under 35 U.S.C. 154(b) by 597 days.

(21) Appl. No.: 12/092,171

(22) PCT Filed: Nov. 1, 2006

(86) PCT No.: PCT/JP2006/321832
§ 371 (c)(1),
(2), (4) Date: Apr. 30, 2008

(87) PCT Pub. No.: WO2007/052691
PCT Pub. Date: May 10, 2007

(65) Prior Publication Data
US 2009/0124256 A1    May 14, 2009

(30) Foreign Application Priority Data
Nov. 2, 2005    (JP) .................................. 2005-320160

(51) Int. Cl.
*H04W 4/00* (2009.01)
(52) U.S. Cl. ..................... 455/435.1; 455/423; 455/424; 455/436; 455/442; 370/328; 370/338; 370/331
(58) Field of Classification Search ............... 455/435.1, 455/423, 424, 436, 442; 370/328, 338, 331
See application file for complete search history.

(56) References Cited

U.S. PATENT DOCUMENTS 7,082,308 B1 * 7/2006 Kaura et al. .................. 455/445
2005/0007995 A1   1/2005 Inoue
2006/0146748 A1   7/2006 Ng
2006/0182128 A1   8/2006 Nakata
2007/0036115 A1   2/2007 Ono

FOREIGN PATENT DOCUMENTS

| EP | 1 855 427 | 3/2008 |
|---|---|---|
| JP | 2003-329745 | 11/2003 |
| JP | 2004-135103 | 4/2004 |
| JP | 2005-12281 | 1/2005 |
| JP | 2005-33374 | 2/2005 |
| WO | 2006/093288 | 9/2006 |

OTHER PUBLICATIONS

D.B. Johnson et al. "Mobility Support in IPv6," Network Working Group RFC:3775 Category: Standards Track, p. 1-165, Jun. 2004.
N. Montavont et al., "Analysis of Multihoming in Mobile IPv6", draft-montavont-mobileip-multihoming-pb-statement-04.txt, IETF MIP6 Working Group Internet-Draft, p. 1-33, Jun. 8, 2005.
International Search Report dated Jan. 16, 2007.

* cited by examiner

*Primary Examiner* — Nghi H Ly
(74) *Attorney, Agent, or Firm* — Dickinson Wright PLLC

(57) ABSTRACT

A technique for preventing an MN (Mobile Node) having a plurality of interfaces from being caught in an infinite transfer loop includes, when each of the plurality of interfaces of the MN is connected to an HN (Home Network), in the MN, an abnormal transfer measures confirming unit grasps whether or not an HA (Home Agent) of each HN has an abnormal transfer measures function for avoiding an infinite transfer loop of infinitely repeating packet transfer in conjunction with another HA. Moreover, in the case of the absence of an HA which is not equipped with the abnormal transfer measures function, a registered control condition deciding unit determines an address registration whereby the MN itself avoids the infinite transfer loop, and a registration control unit derives an appropriate address pattern for the avoidance of the infinite transfer loop and carries out the address registration with respect to each HA.

6 Claims, 9 Drawing Sheets

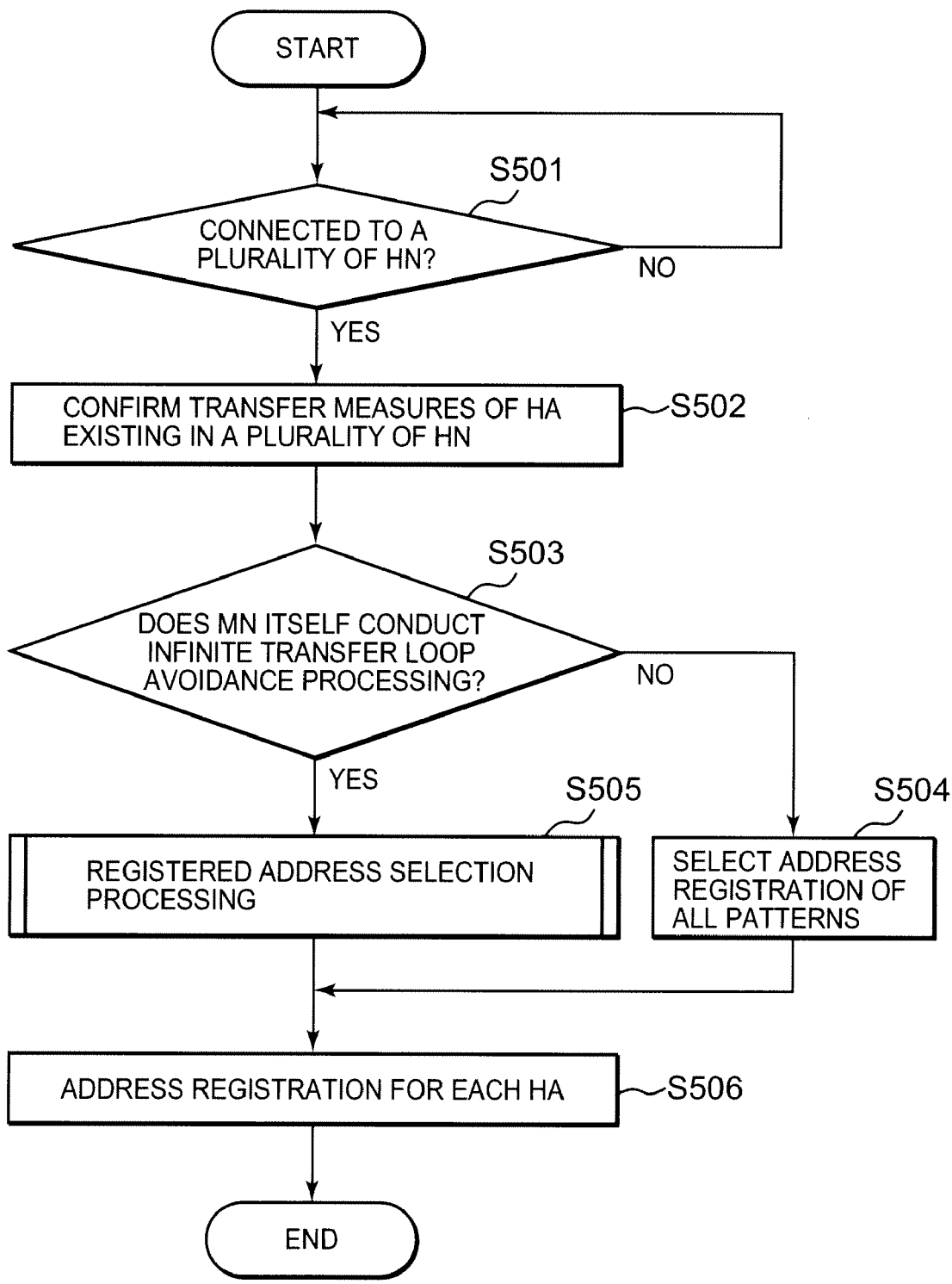

FIG. 3

| | CONNECTION STATE | | HA1 | HA3 | HA3 |
|---|---|---|---|---|---|
| A | I/F1 | HN1 | HoA.h1 | HoA.h2 | HoA.h3 |
| | I/F2 | HN2 | HoA.h2 | HoA.h3 | ///// |
| | I/F3 | HN3 | HoA.h3 | ///// | ///// |
| B | I/F1 | HN1 | HoA.h1 | HoA.h2 | HoA.h3 |
| | I/F2 | HN2 | HoA.h2 | ///// | HoA.h2 |
| | I/F3 | HN3 | HoA.h3 | ///// | ///// |
| C | I/F1 | HN1 | HoA.h1 | HoA.h2 | HoA.h3 |
| | I/F2 | HN2 | HoA.h2 | HoA.h1 | ///// |
| | I/F3 | HN3 | ///// | HoA.h3 | ///// |
| D | I/F1 | HN1 | HoA.h1 | HoA.h2 | HoA.h3 |
| | I/F2 | HN2 | ///// | HoA.h1 | HoA.h1 |
| | I/F3 | HN3 | ///// | HoA.h3 | ///// |
| E | I/F1 | HN1 | HoA.h1 | HoA.h2 | HoA.h3 |
| | I/F2 | HN2 | HoA.h2 | ///// | HoA.h1 |
| | I/F3 | HN3 | ///// | ///// | HoA.h2 |
| F | I/F1 | HN1 | HoA.h1 | HoA.h2 | HoA.h3 |
| | I/F2 | HN2 | ///// | HoA.h1 | HoA.h1 |
| | I/F3 | HN3 | ///// | ///// | HoA.h2 |
| G | I/F1 | HN1 | HoA.h1 | HoA.h2 | HoA.h1 |
| | I/F2 | HN1 | CoA.h1 | ///// | CoA.h1 |
| | I/F3 | HN2 | HoA.h2 | ///// | HoA.h2 |
| H | I/F1 | HN1 | HoA.h1 | HoA.h2 | HoA.h1 |
| | I/F2 | HN1 | CoA.h1 | HoA.h1 | CoA.h1 |
| | I/F3 | HN2 | ///// | CoA.h1 | HoA.h2 |

ADDRESS REGISTRATION CONTROL DEVICE

TECHNICAL FIELD

The present invention relates to an address registration control device within a mobile communication terminal designed to make communications through the use of a packet communication technology, and more particularly to an address registration control device within a mobile communication terminal designed to make communications through the use of the mobile IPv6 (Mobile Internet Protocol version 6) and a multihoming technology.

BACKGROUND ART

At present, in IETF (Internet Engineering Task Force), efforts are in progress to standardize various types of communication technologies. As one of the communication technologies discussed in this IETF, for example, there exists a multihoming technology in which an MN (Mobile Node) introducing the mobile IPv6 (see the following Non-Patent Document 1) to have a mobility function (mobility management function) makes communications by using a plurality of addresses simultaneously. For example, the following Non-Patent Document 2 describes diverse situations in which an MN comes into a multihomed condition in conjunction with a combination of the number of interfaces, the number of HoAs (home addresses) and the number of CoAs (care-of addresses) in the MN.

In addition, the Non-Patent Document 1 suggests a technique of, when an MN has a plurality of HoAs, inhibiting that a different HoA is used as a CoA. On the other hand, the Non-Patent Document 2 describes that a different HoA is registered as a CoA as an effective case in a multihoming technology and there is a need for an extension of the definitions of an HoA and a CoA and a method of selecting an HoA to be registered as a CoA.

With reference to FIG. 6, a description will be given hereinbelow of, in a conventional multihoming technology, an infinite transfer loop between HAs which can occur in a case in which an MN has a plurality of interfaces and HoAs are allocated from a plurality of HAs (Home Agents) thereto.

FIG. 6 is an illustrative view showing one example of a condition in which an infinite transfer loop is possible with a conventional multihoming technology. FIG. 6 shows an MN (1100) which makes a communication through a network (1300) with a CN (Correspondent Node) (1200).

As shown in FIG. 6, let it be assumed that the MN (1100) has two interfaces and both the two interfaces of the MN (1100) are connected to HNs (Home Networks) to which they pertain. Moreover, let it be assumed that in each of the interfaces there are set HoAs (HoA.h1 and HoA.h2) allocated respectively from an HA1 (1110) and an HA2 (1120).

FIG. 6 is an illustration of a state in which the MN (1100) is connected through links, drawn between the MN (1100) and the HA1 (1110) and between the MN (1100) and the HA2 (1120), to an HN1 (not shown) where the HA1 exists and to an HN2 (not shown) where the HA2 (1120) exists.

In addition, let us assume that the MN (1100) is capable of registering a plurality of CoAs in the HA1 (1110) and the HA2 (1120) and of registering, as CoAs, HoAs under management of other HAs. Accordingly, the MN (1100) can carry out the binding update of the HoA.h2, associated with the HoA.h1, with respect to the HA1 (1110) while it can conduct the binding update of the HoA.h1, associated with the HoA.h2, with respect to the HA2 (1120).

In FIG. 6, a binding cache of each of the HA1 (1110) and the HA2 (1120) is illustratively shown with respect to the MN (1100). The HA1 (1110) can refer to its own binding cache to transfer a packet, addressed to the HoA.h1, to the HoA.h1 or the HoA.h2, and the HA2 (1120) can refer to its own binding cache to transfer a packet, directed to the HoA.h2, to the HoA.h2 or the HoA.h1.

In this connection, in a conventional technique and in an embodiment of the present invention described hereinafter, a binding update method for generating such a binding cache and a binding cache holding method are not particularly limited, but arbitrary methods are employable.

Furthermore, the occurrence of an infinite transfer loop substantially depends upon the fact that a transfer is made on the basis of the registration to a different home network but it has less connection with a method of handling a home address allocated in a home network which is in connection. For this reason, in this specification, although the description of both the conventional technique and the embodiment of the present invention takes up, as an example, a case in which an interface which establishes connection with a home network registers an home address, allocated in the connected home network, in a home agent (for example, in FIG. 6, registering the HoA.h1 existing a CoA entry of a binding cache of the HA1 (1110)), an arbitrary method is employable as a method of registering an address when an interface is connected to a home network. For example, as an address registering method, in addition to the intact registration of a home address, it is possible to employ the acquisition and registration of a care-of address for the connection with a home network, the registration of information indicative of the presence of an interface connected to a home network and a combination thereof. Moreover, it is also acceptable to inhibit a special operation related to the address registration. Incidentally, even in the case of using one of the above-mentioned methods within a range which does not constitute departures from the spirit and scope of the invention disclosed by this specification, it is obvious that the processing procedure according to the present invention disclosed by this specification does not impair the originally intended effects/advantages.

Let it be assumed that the HoA.h1 is set as a destination address of a packet when the CN (1200) carries out the packet transmission to the MN (1100). The packet whose destination is the HoA.h1 transmitted from the CN (1200) can pass through a route indicated by a thick-line arrow in FIG. 6.

That is, the packet whose destination is the HoA.h1 transmitted from the CN (1200) first arrives at the HA1 (1110), and the HA1 (1110) transfers it. At this time, on the basis of some policy or algorithm, the HA1 (1110) refers to its own binding cache to determine transferring the packet to the interface of the MN (1100) in connection with the HN1 or performing the packet encapsulation and then transferring it to the HoA.h2.

In a case in which the packet is transferred to the interface of the MN (1100) connected to the HN1, the MN (1100) can receive the packet at this time. On the other hand, if it is encapsulated and transferred to the HoA.h2, this encapsulated packet arrives at the HA2 (1120).

As well as the HA1 (1110), on the basis of some policy or algorithm, the HA2 (1120) refers to its own binding cache to determine transferring the packet to the interface of the MN (1100) in connection with the HN2 or performing the packet encapsulation and then transferring it to the HoA.h1.

In a case in which the packet is transferred to the interface of the MN (1100) connected to the HN2, the MN (1100) can receive the packet at this time. On the other hand, if it is encapsulated and transferred to the HoA.h1, this encapsulated packet again arrives at the HA1 (1110). Moreover, as a result of the packet transfer processing being again conducted in the HA1 (1110), there is a possibility that the packet is transferred to the HA2, and the packet falls into an infinite transfer loop state in which it is transferred infinitely between the HA1 (1110) and the HA2 (1120), which can make it difficult for the MN (1100) to receive the packet.

Although there is a possibility that the packet is sent to the interface of the MN (1100) according to some policy or algorithm after the transfer thereof is conducted once or repeatedly conducted several times between the HA1 (1110) and the HA2 (1120), also in this case, redundant transfer will occur.

Meanwhile, in the above-mentioned case, in a manner such that an integrated judgment is made on MN binding information contained in a binding cache of each HA forming a passing point of the infinite transfer loop, it is possible to grasp the occurrence of an infinite transfer loop of a packet addressed to the MN. For example, in the example shown in FIG. 6, the infinite transfer loop impossible condition is taken by deleting an HoA registered as a CoA in one of the HA1 (1110) and the HA2 (1120).

Therefore, for example, in a manner such that all the HAs search the occurrence of an infinite transfer loop in cooperation with each other (for example, they confirm the MN binding information contained in the binding caches or append some loop detection identifier to the packet transferred), it is possible to detect the fact that the packet addressed to the MN falls into an infinite transfer loop condition.

In this case, for example, all the HAs are required to introduce functions (each of which will be referred to hereinafter as an abnormal transfer measures function) for preventing an infinite transfer loop condition, such as packaging a function to notify the MN binding information contained in its own binding cache to another HA and a function to append a loop detection identifier and further establishing security association between the HAs.

Moreover, when the MN simply fixes an HoA, to be used, to one of a plurality of HoAs allocated, the infinite transfer loop is preventable in advance.

For example, in the example shown in FIG. 7, the MN (1100), all interfaces of which are connected to the HNs to which they pertain, registers an HoA, managed by each of the HA2 (1120) and an HA3 (1130), as a CoA with respect to only the HA1 (1110), and notifies the HoA under the management of the HA1 to three CNs (CN1 (1210), CN2 (1220) and CN3 (1230)). In this way, as indicated by thick-line arrows in FIG. 7, the packets transmitted from the CN1 (1210), the CN2 (1220) and the CN3 (1230) to the MN (1100) arrives at the HA1 (1110) and then they are sent to the interface of the MN (1100) directly or through another HA, thus suppressing the occurrence of an infinite transfer loop.

Non-Patent Document 1: D. B. Johnson et al., "Mobility Support in IPv6", RFC3775, June 2004.

Non-Patent Document 2: N. Montavont et al., "Analysis of Multihoming in Mobile IPv6", draft-montavont-mobileip-multihoming-pb-statement-04.txt, Jun. 8, 2005

However, in a case in which at least one of a plurality of HAs which can serve as passing points of a packet in an infinite transfer loop does not have the above-mentioned abnormal transfer measures function, difficulty is experienced in detecting the infinite transfer loop. Moreover, in a case in which an MN is equipped with a plurality of interfaces and a large number of HoAs, since there is a possibility of the formation of an infinite transfer loop passing through a large number of HAs, even if all the HAs incorporate an abnormal transfer measures function, there is a possibility that an HA(s) disabling the abnormal transfer measures function exists, for example, because of an increase in processing load.

In addition, with a method in which an MN selectively uses only one of a plurality of HoAs, the MN itself becomes capable of preventing an infinite transfer loop in advance. However, this state does not lead to effectively making efficient use of communication routes to a plurality of networks, and results in abandoning a portion of advantages attainable by the multihoming technology. For this reason, this state is not desirable. In particular, the load of the processing on the packet addressed to the MN concentrates on the HA1 (i.e., the HA1 (1110) in FIG. 7) managing the selected HoA and, in this case, other HAs substantially fulfill only a function as an AR (Access Router).

In a case in which an MN simply comes into connection with an HN, by avoiding the registration of a CoA under the management of another HA in an HA within the HN and by properly adjusting its own HoA to be notified to a plurality of CNs, it is possible to realize the distributed reception of packets at a plurality of interfaces while avoiding the occurrence of an infinite transfer loop. However, this method creates a problem in that the flexibility of a communication system disappears. There is a possibility that a destination address (HoA of the MN) to be used by the CN for the packet addressed to the MN is changed and, as a result, for example, the re-establishment of a session between the CN and the MN or the like occurs.

DISCLOSURE OF THE INVENTION

In consideration of the above-mentioned problems, it is an object of the present invention to provide an address registration control device capable of, in a case in which an MN has a plurality of interfaces, carrying out control so as to prevent an infinite transfer loop on the MN side while making use of the plurality of interfaces as simultaneously as possible.

For achieving the above-mentioned purpose, an address registration control device according to the present invention, which is mounted in a mobile node having a plurality of interfaces and having a home address allocated from each of a plurality of home networks, comprises:

home network connection detecting means for detecting whether or not two or more interfaces of the plurality of interfaces are connected to the home networks different from each other;

abnormal transfer measures confirming means for, when the home network connection detecting means detects the fact that the two or more interfaces are connected to the different home networks, confirming whether or not a home agent existing in each of the different home networks operates an abnormal transfer measures function to avoid the occurrence of a transfer loop where a packet transfer is repeatedly made in conjunction with a different home agent;

registration control condition deciding means for, when the abnormal transfer measures confirming means confirms the presence of a home agent which does not operate the abnormal transfer measures function, determining that the mobile node avoids the occurrence of the transfer loop; and registration control means for, when the registration control condition deciding means determines that the mobile node avoids the occurrence of the transfer loop, deriving a combination of addresses to be registered for each of the home agents and carrying out control so that the derived address combination is registered as information to be referred to by the home agent at the transfer of a packet addressed to the mobile node.

With the above-mentioned configuration, in a case in which an MN has a plurality of interfaces, it is possible to carry out control so as to prevent an infinite transfer loop on the MN side while making use of the plurality of interfaces as simultaneously as possible.

In addition, in the address registration control device according to the present invention, combined with the above-mentioned configuration, the abnormal transfer measures confirming means is arranged to refer to at least one of an inquiry at the home agent existing in each of the different home networks, information notified from the home agent existing in each of the different home networks and an information home agent previously stored in the mobile node for confirming whether or not the home agent operates the abnormal transfer measures function.

With the above-mentioned configuration, the MN can easily make a judgment as to whether or not each HA is operating the abnormal transfer measures function.

Still additionally, in the address registration control device according to the present invention, combined with the above-mentioned configuration, the registration control condition deciding means is arranged to determine that the mobile node avoids the occurrence of the transfer loop in a case in which two or more interfaces are connected to the home network in which the home agent which does not operate the abnormal transfer measures function exists.

With the above-mentioned configuration, an infinite transfer loop possible between HAs which do not operate the abnormal transfer measures function is avoidable on the MN side.

Yet additionally, in the address registration control device according to the present invention, combined with the above-mentioned configuration, the registration control condition deciding means is arranged to regard a plurality of interfaces connected to the same home network as one interface being connected to the home network.

With this configuration, the MN can carry out the transfer loop avoidance processing in consideration of a state in which a plurality of interfaces are in connection with the same network.

Moreover, in the address registration control device according to the present invention, combined with the above-mentioned configuration, the registration control means is arranged to derive the address combination for the avoidance of the transfer loop on the basis of one of the number of sessions, an available band of each of the interfaces, a band needed for each of the sessions, a utilization cost of each HA and a utilization cost of each interface or a combination thereof.

With the above-mentioned configuration, the MN can carry out the transfer loop avoidance processing while maintaining the communication efficiency at a maximum.

Still moreover, in the address registration control device according to the present invention, combined with the above-mentioned configuration, the registration control means is arranged to calculate a combination of links making a connection of two HAs of the home agents existing in each of the different home networks to derive the address combination for the avoidance of the transfer loop.

With the above-mentioned configuration, the MN can calculate a combination of addresses which prevents the occurrence of a transfer loop among two or more HAs.

The address registration control device according to the present invention has the above-described configurations and, in a case in which an MN is equipped with a plurality of interfaces, provides an advantage of enabling the control to prevent an infinite transfer loop on the MN side while making use of the plurality of interfaces as simultaneously as possible.

BRIEF DESCRIPTION OF THE DRAWINGS

FIG. 2 is a flow chart showing one example of an operation of the MN according to the embodiment of the present invention.

FIG. 3 is an illustration of one example of an address registration pattern which prevents the occurrence of an infinite transfer loop in a case in which the MN has three interfaces, according to the embodiment of the present invention.

BEST MODE FOR CARRYING OUT THE INVENTION

An embodiment of the present invention will be described hereinbelow with reference to the drawings.

Figure 1:
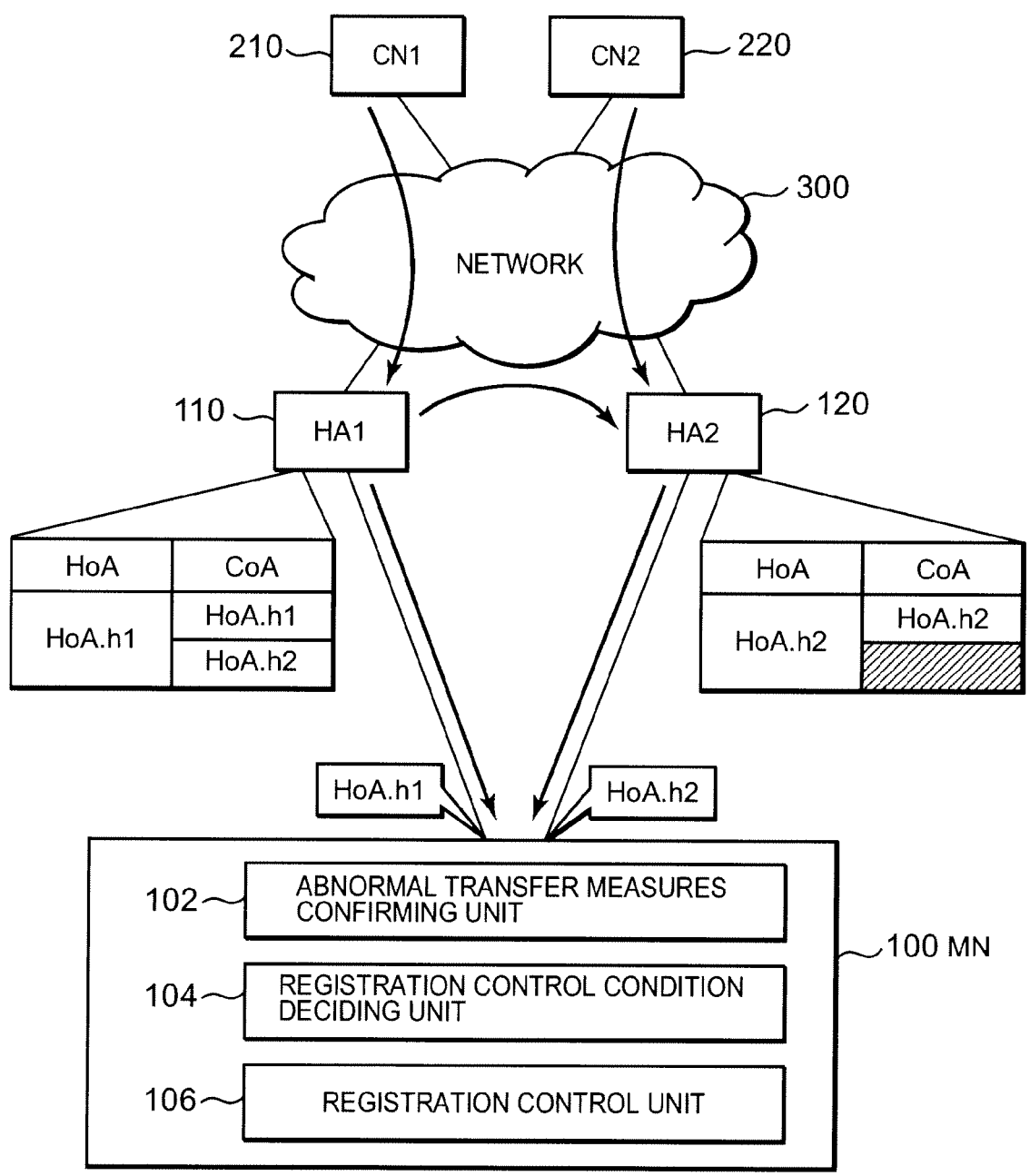
FIG. 1 is an illustrative view showing one examples of a network configuration and configuration of an MN according to an embodiment of the present invention.

First of all, referring to FIG. 1, a description will be given of one example of a configuration according to an embodiment of the present invention. FIG. 1 is an illustrative view showing one examples of a network configuration and configuration of an MN according to an embodiment of the present invention.

FIG. 1 shows that an MN (100) makes communications through a network (300) with a CN (210) and a CN2 (220).

In this configuration, let it be assumed that the MN (100) is equipped with two interfaces and both the two interfaces of the MN (100) come into connection with HNs to which they pertain. Moreover, let it be assumed that in each of the interfaces there are set HoAs (HoA.h1 and HoA.h2) allocated respectively from an HA1 (110) and an HA2 (120).

Shown in FIG. 1 is a state in which the MN (100) is connected through links, drawn between the MN (100) and the HA1 (110) and between the MN (100) and the HA2 (120), to an HN1 (not shown) where the HA1 exists and to an HN2 (not shown) where the HA2 (120) exists.

Moreover, let us assume that the MN (100) is capable of registering a plurality of CoAs in the HA1 (110) and the HA2 (120) and of registering, as CoAs, HoAs under management of other HAs.

Accordingly, the MN (100) can carry out the binding update of an HoA.h2, associated with an HoA.h1, with respect to the HA1 (110) while it can conduct the binding update of the HoA.h1, associated with the HoA.h2, with respect to the HA2 (120).

In addition to the functions of a conventional MN, the MN (100) shown in FIG. 1 further has an abnormal transfer measures confirming unit (102), a registration control condition deciding unit (104) and a registration control unit (106). Incidentally, these functions are realizable through the use of hardware and/or software, and they can be introduced as arbitrary protocol functions.

The abnormal transfer measures confirming unit (102) of the MN (100) has a function to make a judgment as to whether or not the interfaces of the MN (100) come into connection with a plurality of HNs and, if the interfaces of the MN (100) are in connection with the plurality of HNs, make a confirmation at the HA of each of the HNs whether or not the HA introduces an abnormal transfer measures function. Moreover, it is also appropriate that the abnormal transfer measures confirming unit (102) makes a confirmation at the HA having the abnormal transfer measures function as to whether or not the abnormal transfer measures function is actually in operation.

In this connection, it is preferable that the abnormal transfer measures confirming unit (102) regards the interfaces connected to the same HN as the establishment of one connection. For example, in a case in which the MN (100) has three interfaces and the two interfaces thereof are in connection with the same HN1 while the remaining one interface is in connection with the HN2 (HN different from the HN1), the abnormal transfer measures confirming unit (102) makes a judgment that the interfaces are in connection with two HNs.

As a method (abnormal transfer measures confirming method) of making a judgment through the use of the abnormal transfer measures confirming unit (102) as to whether or not the interfaces of the MN (100) are in connection with a plurality of HNs, an arbitrary method is employable. For example, it is possible to employ the following three methods.

For example, as a first abnormal transfer measures confirming method, there exists a method in which the MN (100) actively makes an inquiry at the HA1 (110) and the HA2 (120) about the introduction of the abnormal transfer measures function (moreover, the present operation). In this case, for example, the MN (100) transmits a message, which is for making an inquiry about the abnormal transfer measures function (it is also acceptable that a message existing so far is also used therefor), to an HA of each HN and receives a response message including the result of the inquiry (it is also acceptable that a message existing so far is also used therefor), which enables the MN (100) to grasp the presence or absence of the introduction of the abnormal transfer measures function into the HA (moreover, whether or not it is currently in operation).

In the case of the first abnormal transfer measures confirming method, there is a need for the HA having an abnormal transfer measures function to introduce a function for grasping the reception of an inquiry about the abnormal transfer measures function from the MN (100) through the use of a given message and further a function for generating/transmitting a response message indicative of the fact that it has the abnormal transfer measures function. Moreover, it is also appropriate that the HA is designed to be capable of generating/transmitting a response message indicative of the fact that it has the abnormal transfer measures function but the abnormal transfer measures function is currently in a non-operating state.

On the other hand, in the case of an HA which does not have the abnormal transfer measures function, it is preferable that the HA ignores the inquiry message from the MN (100) (that is, it does not reply a response message indicative of the presence or absence of the abnormal transfer measures function) or that the HA returns an error message indicating that the inquiry message is not recognizable. It is also appropriate that the HA having no abnormal transfer measures function incorporates a function to generate/transmit a response message indicative of no possession of the abnormal transfer measures function in response to an inquiry from the MN (100).

It is also acceptable that an arbitrary communication server made to grasp the presence or absence of the abnormal transfer measures function in an HA (moreover, whether or not it is currently in operation) exists in each HN or over a plurality of HNs and the MN (100) makes an inquiry at this communication server.

In addition, for example, as a second abnormal transfer measures confirming method, there is a method in which the MN (100) passively receives a notification message indicative of the presence or absence of the abnormal transfer measures function (moreover, whether or not it is currently in operation) from the HA1 (110) and the HA2 (120). In this case, the HA equipped with the abnormal transfer measures function is required to introduce a function to notify the fact of the presence of the abnormal transfer measures function (moreover, whether or not it is currently in operation) through the use of, for example, an RA (Router Advertisement) message.

In a case in which information from an HA having no abnormal transfer measures function does not contain the information indicative of the presence of the abnormal transfer measures function, the MN (100) can make a judgment that the abnormal transfer measures function is not mounted in this HA. Moreover, it is also appropriate that the HA having no abnormal transfer measures function has a function to generate/transmit a notification message indicative of the fact that it does not introduce the abnormal transfer measures function.

Still additionally, for example, as a third abnormal transfer measures confirming method, there is a method in which the MN (100) previously grasps the presence or absence of the abnormal transfer measures function in an HA of each HN. Concretely, the abnormal transfer measures function information on the HA of each HN is stored in an information storing unit (not shown in FIG. 1) of the MN (100) through the manual setting by a user of the MN (100) or through the remote setting by an ISP (Internet Service Provider) the MN (100) uses, and the MN (100) refers to the information stored in this information storing unit, thus grasping the presence or absence of the abnormal transfer measures function in the HA (moreover, whether or not it is currently in operation).

Furthermore, the registration control condition deciding unit (104) of the MN (100) has a function to receive, from the abnormal transfer measures confirming unit (102), a result of the confirmation as to whether or not the HA of each HN conducts the abnormal transfer measures and, on the basis of this confirmation result, determine whether or not the MN (100) executes the address registration control.

This registration control condition deciding unit (104) determines, according to a condition of the abnormal transfer measures in the HA of each HN, whether or not the MN (100) itself carries out the address registration control, and the condition under which the MN (100) itself carries out the address registration control can be arbitrarily set. A description will be given hereinbelow of one example of the condition in the case of determining that the MN (100) itself carries out the address registration control.

For example, in a case in which the abnormal transfer measures function is not mounted in only one of the HAs of the respective HNs, there is a possibility that redundant transfer takes place. Under this condition, it is preferable that the MN (100) executes the address registration control. Since the possibility that an infinite transfer loop occurs due to the abnormal transfer measures function mounted in another HA is low, it is not always necessary that the MN (100) carries out the address registration control.

Moreover, in a case in which two or more HAs of the HAs of the respective HNs do not introduce the abnormal transfer measures function, there is a possibility that the infinite transfer loop occurs among the HAs which do not introduce the abnormal transfer measures function. Accordingly, under this condition, the registration control condition deciding unit (104) makes a judgment that the MN (100) is required to carry out the address registration control without fail.

Still moreover, in a case in which all the HAs of the respective HNs have an abnormal transfer measures function, there is no need for the MN (100) itself to carry out the address control particularly, and the abnormal transfer measures processing for avoiding the infinite transfer loop can be conducted on the network side. Therefore, in this case, since the abnormal transfer measures processing on the network side provides a higher efficiency for the MN (100), the registration control condition deciding unit (104) determines that the MN (100) itself does not take the abnormal transfer measures. Even in a case in which all the HAs of the respective HNs carry out the abnormal transfer measures (that is, in all the cases), it is also appropriate that the MN (100) itself carries out the address registration control.

The registration control unit (106) of the MN (100) has a function to receive a result of the determination, from the registration control condition deciding unit (104), as to whether or not the MN (100) itself conducts the address registration control and, on the basis of the determination result, select an address to be registered in each HA. For the selection of the address, the registration control unit (106) is required to select an address to be registered in each HA so as to avoid at least an infinite transfer loop. Although it is basically desirable that the address selection is made so as to realize a state of the avoidance of the infinite transfer loop and the registration of a maximum number of addresses, it is also appropriate to make the address selection in consideration of the number of sessions conducted in conjunction with each CN which is currently in communication, an available band of each of the interfaces, a band (QoS band) needed for each of the sessions, a utilization cost of each HA and a utilization cost of each interface and others.

Secondly, referring to FIG. 2, a description will be given of one example of an operation in a case in which the MN (100) carries out the address registration in the network configuration shown in FIG. 1. FIG. 2 is a flow chart showing one example of an operation of an MN according to the embodiment of the present invention.

As FIG. 2 shows, networks with which a plurality of interfaces of the MN (100) are in connection monitors HNs so that a monitor is made as to whether or not the MN (100) is in connection with a plurality of HNs (step S501). In a case in which the MN (100) is in connection with HN less than or equal to one in number, the operation according to the present invention is not conducted, and the operational flow goes to the step S501 for continuously carrying out the processing to monitor whether or not the MN (100) establishes connection with a plurality of HNs.

On the other hand, in a case in which the detection shows that the MN (100) comes into connection with a plurality of HNs (for example, as shown in FIG. 1, the two interfaces of the MN (100) are connected to the HA1 (110) and the HA2 (120), respectively), the abnormal transfer measures confirming unit (102) of the MN (100) confirms the abnormal transfer measures of each of HAs existing respectively in the plurality of HNs (step S502).

As FIG. 1 shows, in a case in which the MN (100) has two interfaces and one is in connection with the an HN where HA1 (110) exists while the other is in connection with an HN where the HA2 (120) exists, the confirmation result in the step S502 shows one of a case in which both the HA1 (110) and the HA2 (120) introduce an abnormal transfer measures function, a case in which one of the HA1 (110) and the HA2 (120) does not introduce the abnormal transfer measures function and a case in which both the HA1 (110) and the HA2 (120) have no abnormal transfer measures function.

The confirmation result in the abnormal transfer measures confirming unit (102) of the MN (100) is notified to the registration control condition deciding unit (104). Moreover, the registration control condition deciding unit (104) of the MN (100) makes a determination as to whether or not the MN (100) itself conducts the infinite transfer loop avoidance processing (step S503).

For example, if the confirmation result in the abnormal transfer measures confirming unit (102) shows that both the HA1 (110) and the HA2 (120) introduce an abnormal transfer measures function, in the step S503, the registration control condition deciding unit (104) determines that the MN (100) itself does not conduct the infinite transfer loop avoidance processing.

In consequence, the registration control unit (106) of the MN (100) selects the address registration in all the patterns (combinations) in a step S504. For example, in the example shown in FIG. 1, as the selection in the step S504, the binding update is made with the HoA.h2 being associated as a CoA of the HoA.h1 with respect to the HA1 (110) while the binding update is made with the HoA.h1 being associated as a CoA of the HoA.h2 with respect to the HA2 (120).

On the other hand, for example, if the confirmation result in the abnormal transfer measures confirming unit (102) shows that one of or both the HA1 (110) and the HA2 (120) do not have an abnormal transfer measures function, in a step S505, the registration control condition deciding unit (104) determines that the MN (100) itself does not carry out the infinite transfer loop avoidance processing. Also in a case in which one of or both the HA1 (110) and the HA2 (120) do not have an abnormal transfer measures function, the MN (100) itself conducts the address registration processing.

As a result, in the step S505, the registration control unit (106) of the MN (100) conducts the registered address selection processing for the selection of addresses to be registered for the HA1 (110) and the HA2 (120) so that no infinite transfer loop occurs and the address registration of the MN (100) realizes the communication at a maximum or with highest efficiency. For example, in the example shown in FIG. 1, in the step S505, the binding update is made with the HoA.h2 being associated as a CoA of the HoA.h1 with respect to the HA1 (110) while the binding update is not made with respect to the HA2 (120) (alternatively, a selection is made so as to notify, to the HA2 (120), the fact that the interface in which the HoA.h2 is set has returned) to the HN2.

Moreover, the MN (100) registers an address selected by the registration control unit (106) (that is, address selected in the step S504 or in the step S505) for each HA (step S506). After the completion of the step S506, the MN (100) again returns to the step S501 and continues the connection monitoring state to the plurality of HNs.

For the address registration in the step S506, it is also acceptable a binding message for the overwriting of a binding cache is transmitted to all the HAs, or that the binding message is not transmitted to an HA for which the binding information is not changed. Moreover, it is also acceptable to transmit a binding message for adding or deleting a portion of the binding information (changing a portion of the already existing binding information).

Through the above-mentioned operation, the HA1 (110) holds the binding information for transferring a packet, addressed to the HoA.h1, to the HoA.h1 connected to the HN1 or the HoA.h2, while the HA2 (120) holds the binding information for transferring a packet, addressed to the HoA.h2, to the HoA.h2 connected to the HN2.

Thus, the packet which is transmitted from the CN1 (210) and whose destination is the HoA.h1 and the packet which is transmitted from the CN2 (220) and whose destination is the HoA.h2 can pass through the routes indicated by thick-line arrows, respectively.

That is, the packet which is transmitted from the CN1 (210) and whose destination is the HoA.h1 first arrives at the HA1 (110). Moreover, the HA1 (110) refers to its own binding cache to make a determination on the basis of some policy or algorithm as to whether the packet is transferred to the interface of the MN (100) connected to the HN1 or the packet is encapsulated and then transferred to the HoA.h2.

In a case in which the packet is transferred to the interface of the MN (100) connected to the HN1, the MN (100) can receive the packet at this time. On the other hand, when the packet is encapsulated and transferred to the HoA.h2, this encapsulated packet arrives at the HA2 (120).

The HA2 (120) refers to its own binding cache as well as the HA1 (110) and transfers the received packet to the interface of the MN (100) connected to the HN2. Moreover, the packet which is transmitted from the CN2 (220) and whose destination is the HoA.h2 is transferred to the interface of the MN (100) connected to the HN2 after the arrival at the HA2 (120). As mentioned above, the packet which is transmitted from the CN1 (210) and whose destination is the HoA.h1 arrives through the HA1 (110) or through the HA1 (110) and the HA2 (120) at the MN (100) while the packet which is transmitted from the CN2 (220) and whose destination is the HoA.h2 arrives through the HA2 (120) at the MN (100), thus suppressing the occurrence of the infinite transfer loop. In a case in which the MN (100) does not carry out the binding update on the HA2 (120) (or make deletion) and no registration related to the MN (100) exists in the HA2 (120), as prescribed in the mobile IPv6, it is also considered that the HA2 (120) does not conduct the processing related to the packet addressed to the MN (100).

The above-described example shows a simple case in which the MN (100) has two interfaces. In this case, with respect to one HA (for example, HA which desires the load distribution), the HoA managed by the other HA is registered as a CoA while, with respect to the other HA, the CoA is deleted, which enables easily seizing that the infinite transfer loop is avoidable. However, in a case in which three or more interfaces exist in the MN (100), the patterns of addresses to be registered become more complicated.

FIG. 3 is an illustration of, in the embodiment of the present invention, one example of an address registration pattern which prevents the occurrence of an infinite transfer loop in a case in which the MN (100) has three interfaces (designated at I/F in FIG. 3).

For example, in the rows A to F in FIG. 3, in a state where three interfaces (I/F1 to I/F3) are allocated to different HNs, respectively, and all the three interfaces are in connection with the HNs to which they pertain, a pattern of addresses to be registered for the respective HA1 (110) to HA3 (130). The row A in FIG. 3 shows that the HoA.h2 and the HoA.h3 are registered in a state associated with the HoA. In with respect to the HA1 (110) while the HoA.h3 is registered in a state associated with the HoA.h2 with respect to the HA2 (120) and the registration is made with respect to the HA3 (130) so as to carry out the direct transfer to only the HoA.h3.

Figure 4A:
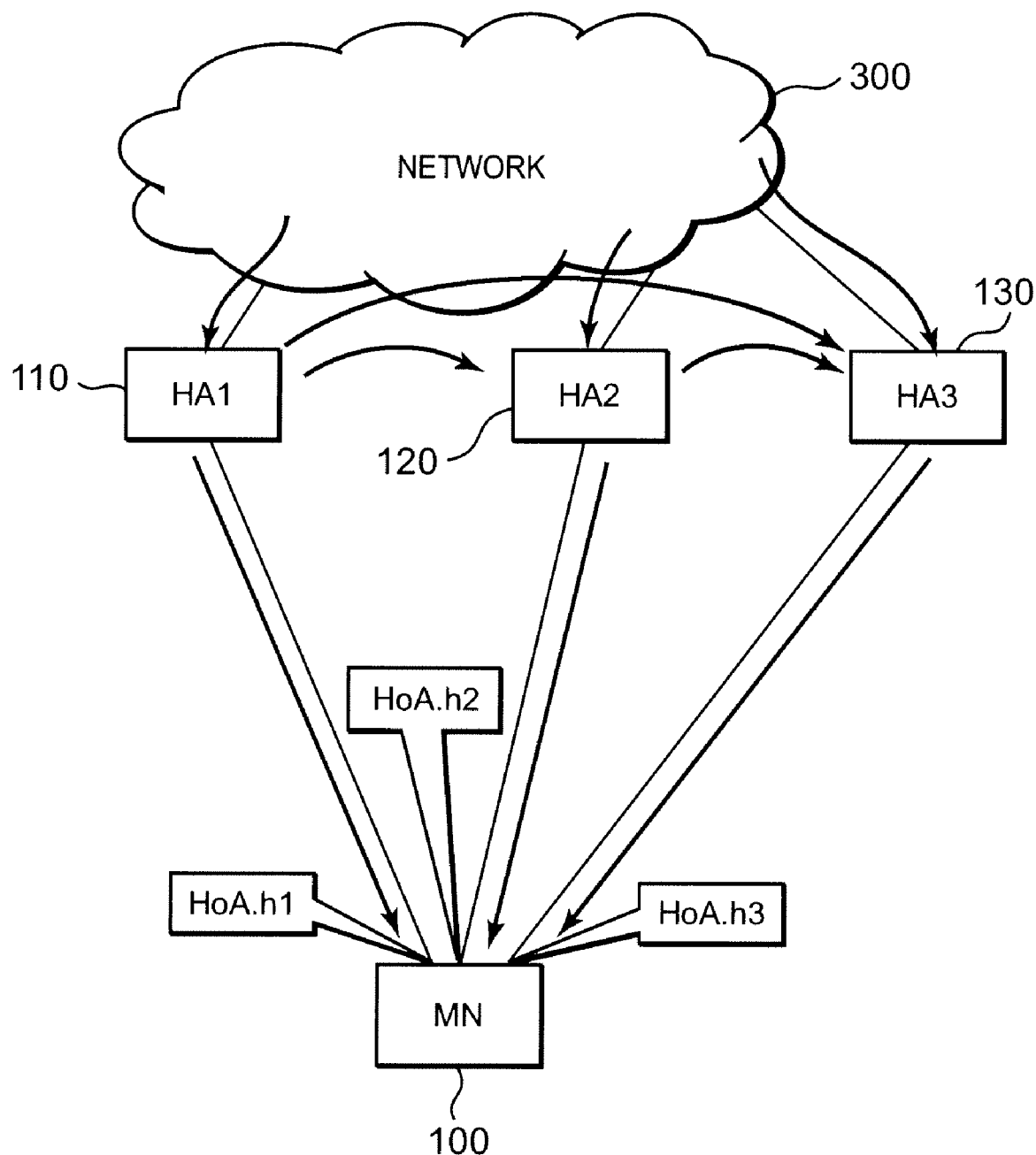
FIG. 4A is an illustrative view showing a packet route in a case in which an address pattern indicated in the row A of FIG. 3 is registered.

In addition, FIG. 4A is an illustrative view showing a packet route in the case of the registration of the address pattern indicated in the row A in FIG. 3. In FIG. 4A, a CN which is the packet transmission addresser is omitted from the illustration.

As shown in FIG. 4A, the HA1 (110) which has received a packet addressed to the HoA.h1 can refer to the binding information on the MN (100) so as to selectively carry out the "direct transfer to the HoA.h1 connected to the HN1", the "transfer to the HA2 (120) in a state addressed to the HoA.h2 and encapsulated" and the "transfer to the HA3 (130) in a state addressed to the HoA.h3 and encapsulated". On the other hand, the HA2 (120) which has received a packet addressed to the HoA.h2 can refer to the binding information on the MN (100) for selectively carrying out the "direct transfer to the HoA.h2 connected to the HN2" and the "transfer to the HA3 (130) in a state addressed to the HoA.h3 and encapsulated". Moreover, the HA3 (130) which has received a packet addressed to the HoA.h3 can refer to the binding information on the MN (100) for selectively conducting the "direct transfer to the HoA.h3 connected to the HN3".

Thus, with the packet transfer illustratively shown in FIG. 4A, it is possible to avoid the occurrence of an infinite transfer loop. Also in the case of the rows B to F in FIG. 3, the occurrence of an infinite transfer loop is avoidable.

Moreover, for example, the row G in FIG. 3 shows an address pattern to be registered for the respective HA1 (110) to HA3 (130) in a state where two interfaces (I/F1 and I/F2) of the three interfaces (I/F1 to I/F3) are in connection with the same HN1 (the connection of I/F1 and I/F2 to the same HN1 is regarded as one connection as mentioned above) and the remaining one interface (I/F3) is in connection with the different HN2), which enables the avoidance of an infinite transfer loop. In the row G in FIG. 3, the HoA.h1 is set for the I/F1, the CoA.h1 (CoA having a prefix of the HN1) is set for the I/F2 and the HoA.h2 is set for the I/F3, while the CoA.h1 and the HoA.h2 are registered in a state associated with the HoA.h1 with respect to the HA1 (110) and a registration is made with respect to the HA2 (120) so as to make the direct transfer to only the HoA.h2 connected to the HN2.

Figure 4B:
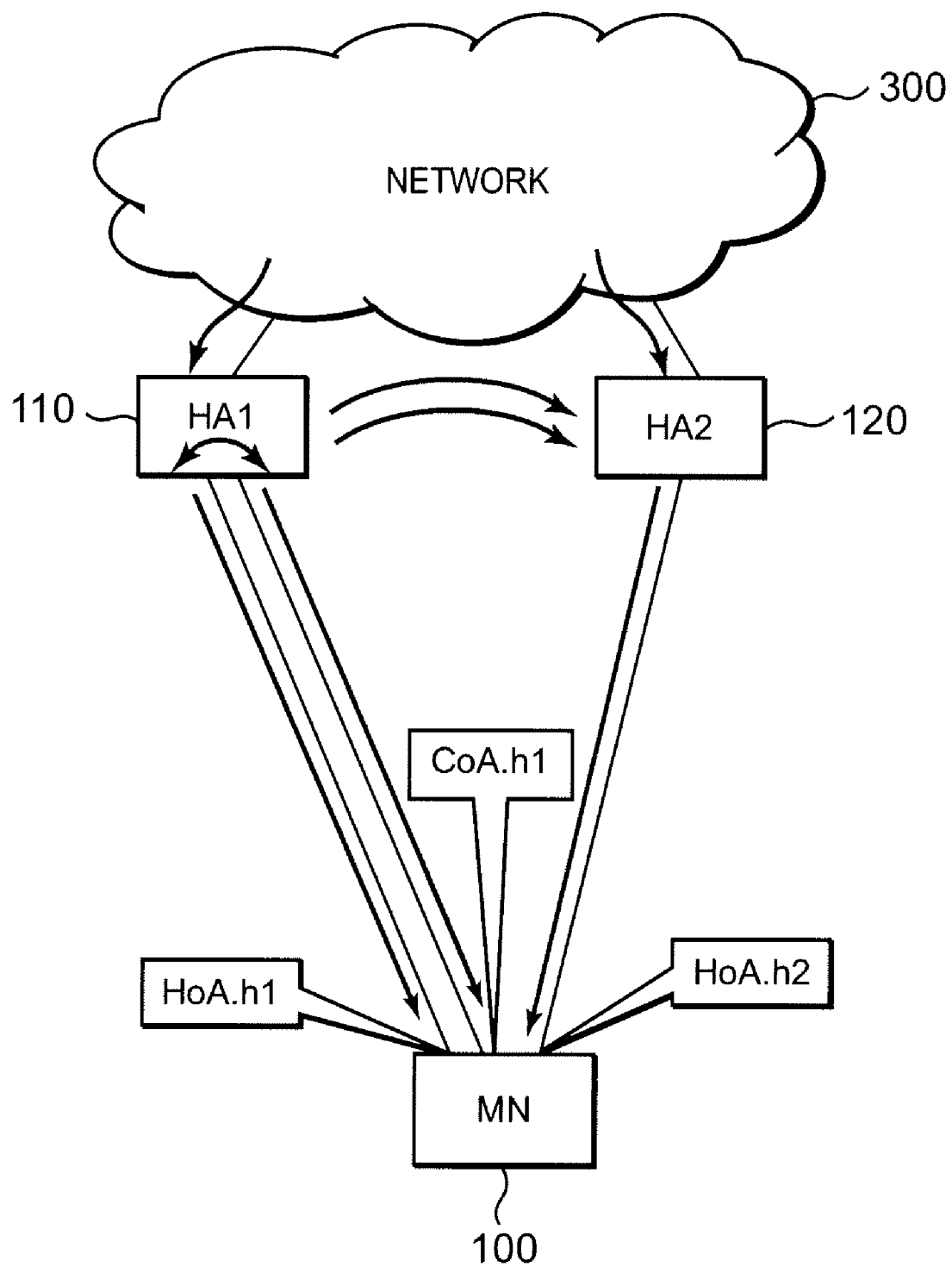
FIG. 4B is an illustrative view showing a packet route in a case in which an address pattern indicated in the row G of FIG. 3 is registered.

FIG. 4B is an illustrative view showing a packet route in the case of the registration of the address pattern shown in the row G of FIG. 3. In FIG. 4B, a CN which is the packet transmission addresser is omitted from the illustration.

As shown in FIG. 4B, upon receipt of a packet addressed to the HoA.h1, by referring to the binding information on the MN (100), the HA1 (110) can selectively carry out the "direct transfer to the HoA.h1 connected to the HN1", the "direct transfer to the CoA.h1 connected to the HN1" and the "transfer to the HA2 (120) in a state addressed to the HoA.h2 and encapsulated". On the other hand, upon receipt of a packet addressed to the CoA.h1, by referring to the binding information on the MN (100), the HA1 (110) can selectively carry out the "direct transfer to the CoA.h1 connected to the HN1", the "direct transfer to the HoA.h1 connected to the HN1 and the "transfer to the HA2 (120) in a state addressed to the HoA.h2 and encapsulated". Moreover, upon receipt of a packet addressed to the HoA.h2, by referring to the binding information on the MN (100), the HA2 (120) can selectively conduct the "direct transfer to the HoA.h2 connected to the HN2".

Moreover, for example, the row H in FIG. 3 shows that the HoA.h1 is set for the I/F1, the CoA.h1 (CoA having a prefix of the HN1) is set for the I/F2 and the HoA.h2 is set for the I/F3, while the CoA.h1 is registered in a state associated with the HoA.h1 with respect to the HA1 (110) and the HoA.h1 and the CoA.h1 are registered in a state associated with the HoA.h2 with respect to the HA2 (120).

Figure 4C:
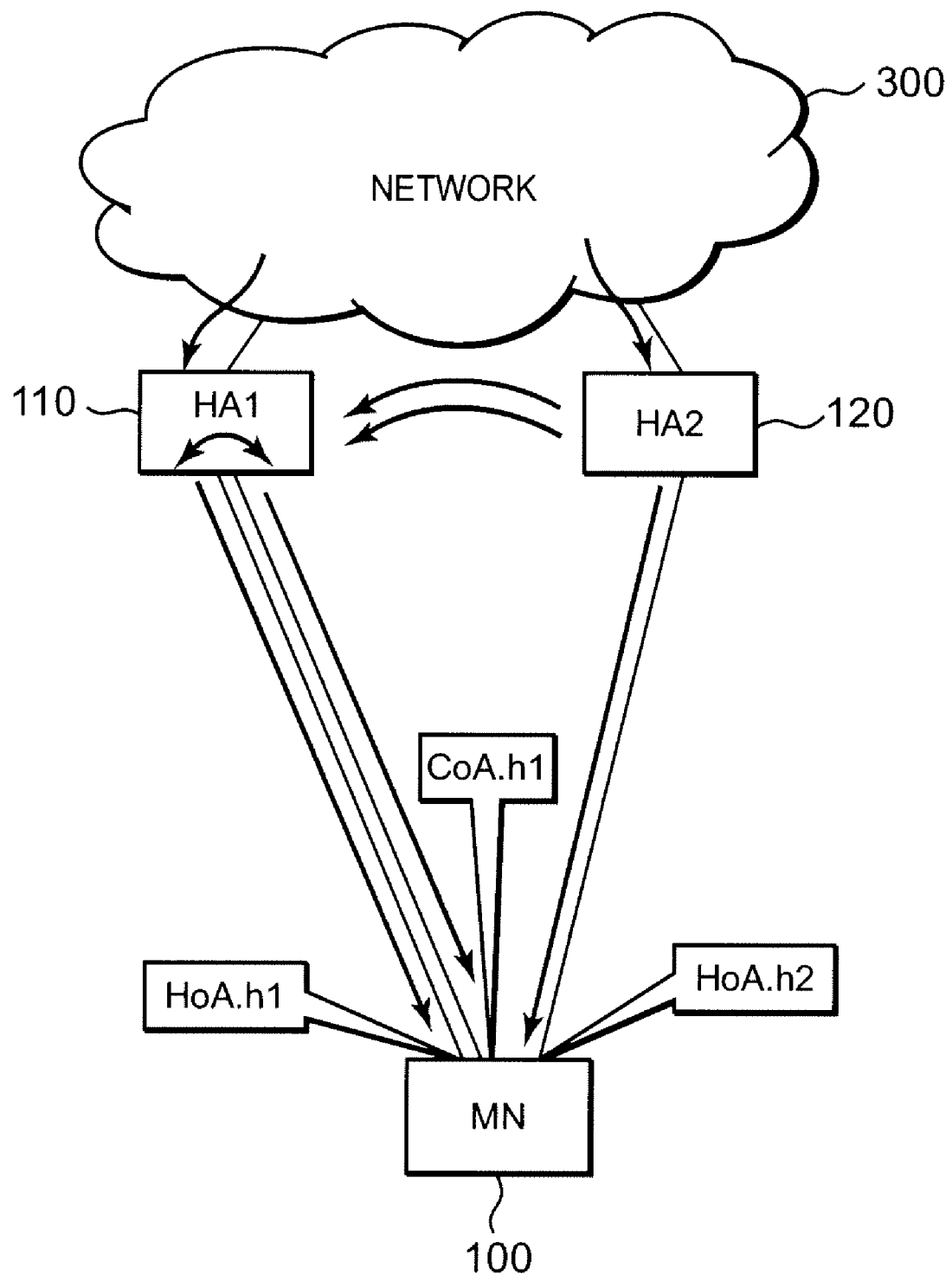
FIG. 4C is an illustrative view showing a packet route in a case in which an address pattern indicated in the row H of FIG. 3 is registered.

FIG. 4C is an illustrative view showing a packet route in the case of the registration of the address pattern shown in the row H of FIG. 3. In FIG. 4C, a CN which is the packet transmission addresser is omitted from the illustration.

As shown in FIG. 4C, upon receipt of a packet addressed to the HoA.h1 or the CoA.h1, by referring to the binding information on the MN (100), the HA1 (110) can selectively carry out the "direct transfer to the HoA.h1 connected to the HN1" and the "direct transfer to the CoA.h1 connected to the HN1". Moreover, upon receipt of a packet addressed to the HoA.h2, by referring to the binding information on the MN (100), the HA2 (120) can selectively carry out the "direct transfer to the HoA.h2 connected to the HN2", the "transfer to the HA1 (110) in a state addressed to the HoA.h1 and encapsulated" and the "transfer to the HA1 (110) in a state addressed to the CoA.h1 and encapsulated".

As described above, with the packet transfer shown illustratively in FIG. 4B and in FIG. 4C, the occurrence of an infinite transfer loop is avoidable. Moreover, although not shown in FIG. 3, also in the case of combinations of the addresses set for the I/F1 to I/F3 being interchanged with each other, the occurrence of an infinite transfer loop is avoidable.

As well as the above-described address patterns, also in the case of considering various values such as the number of interfaces, the number of HNs and the number of HoAs, an address pattern can be derived for avoiding the occurrence of an infinite transfer loop. A detailed description thereof will be omitted here.

Figure 5:
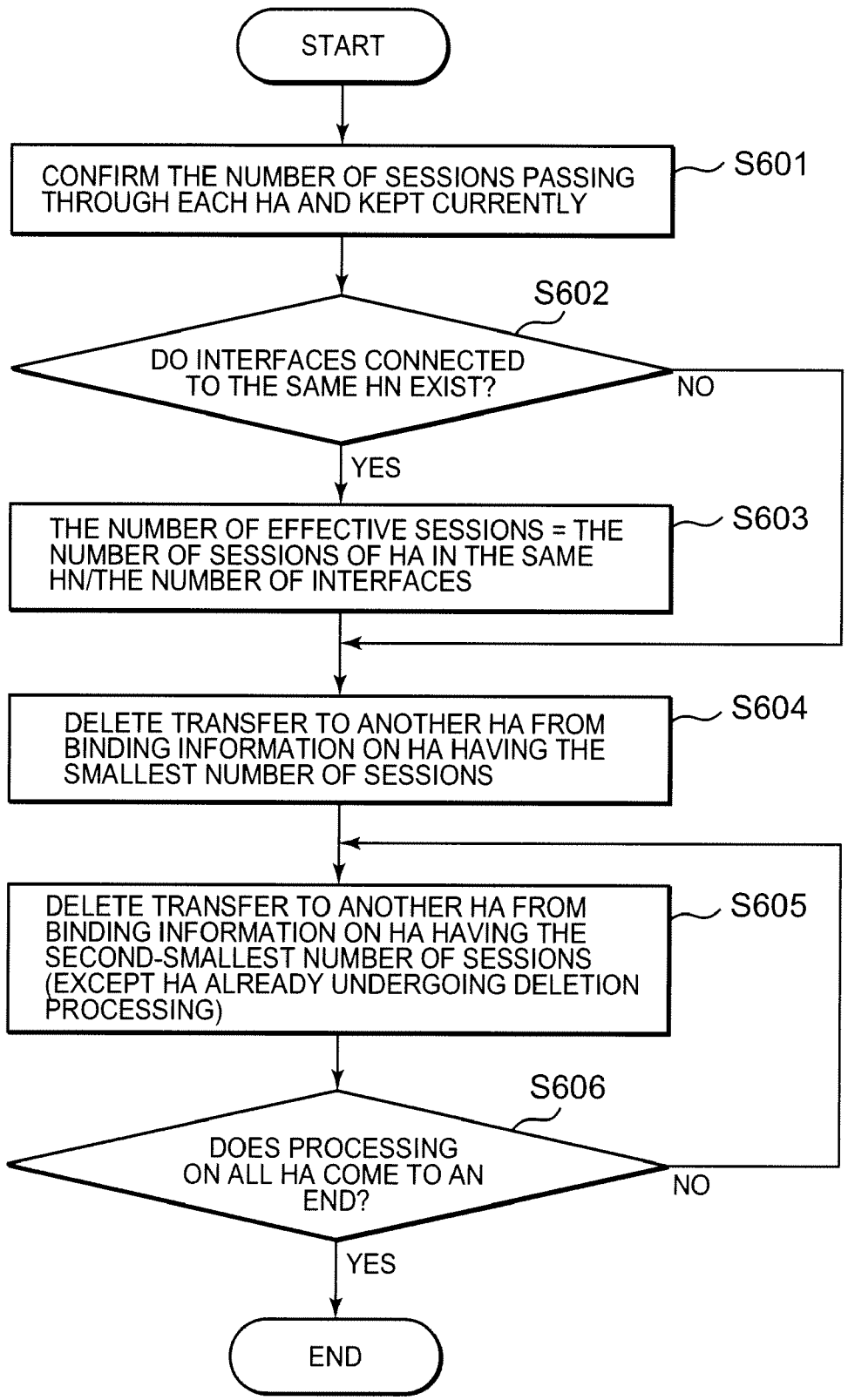
FIG. 5 is a flow chart showing one example of registered address selection processing according to the embodiment of the present invention.
Figure 6:
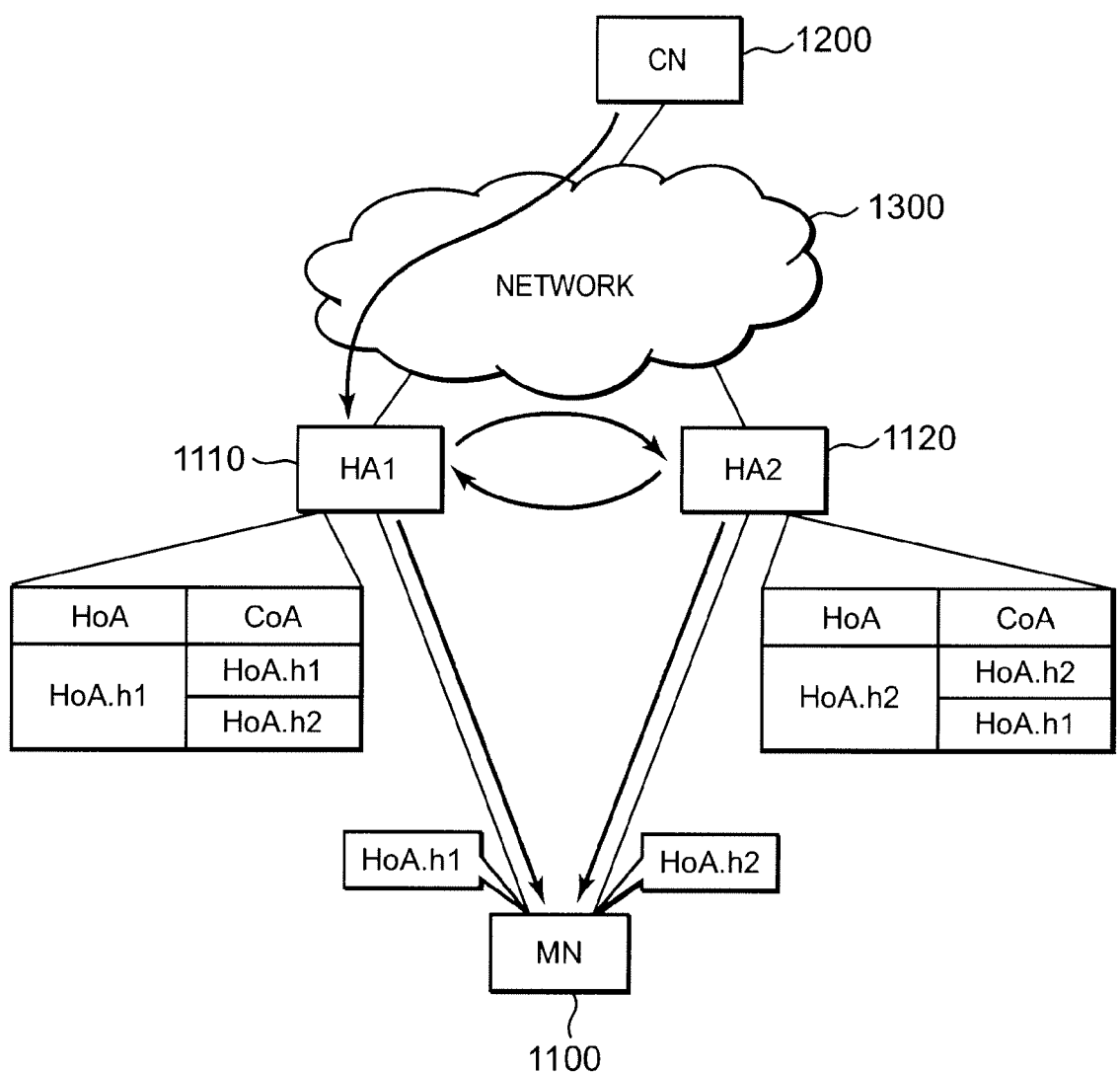
FIG. 6 is an illustration of a condition in which an infinite transfer loop can take place in a conventional multihoming technology.
Figure 7:
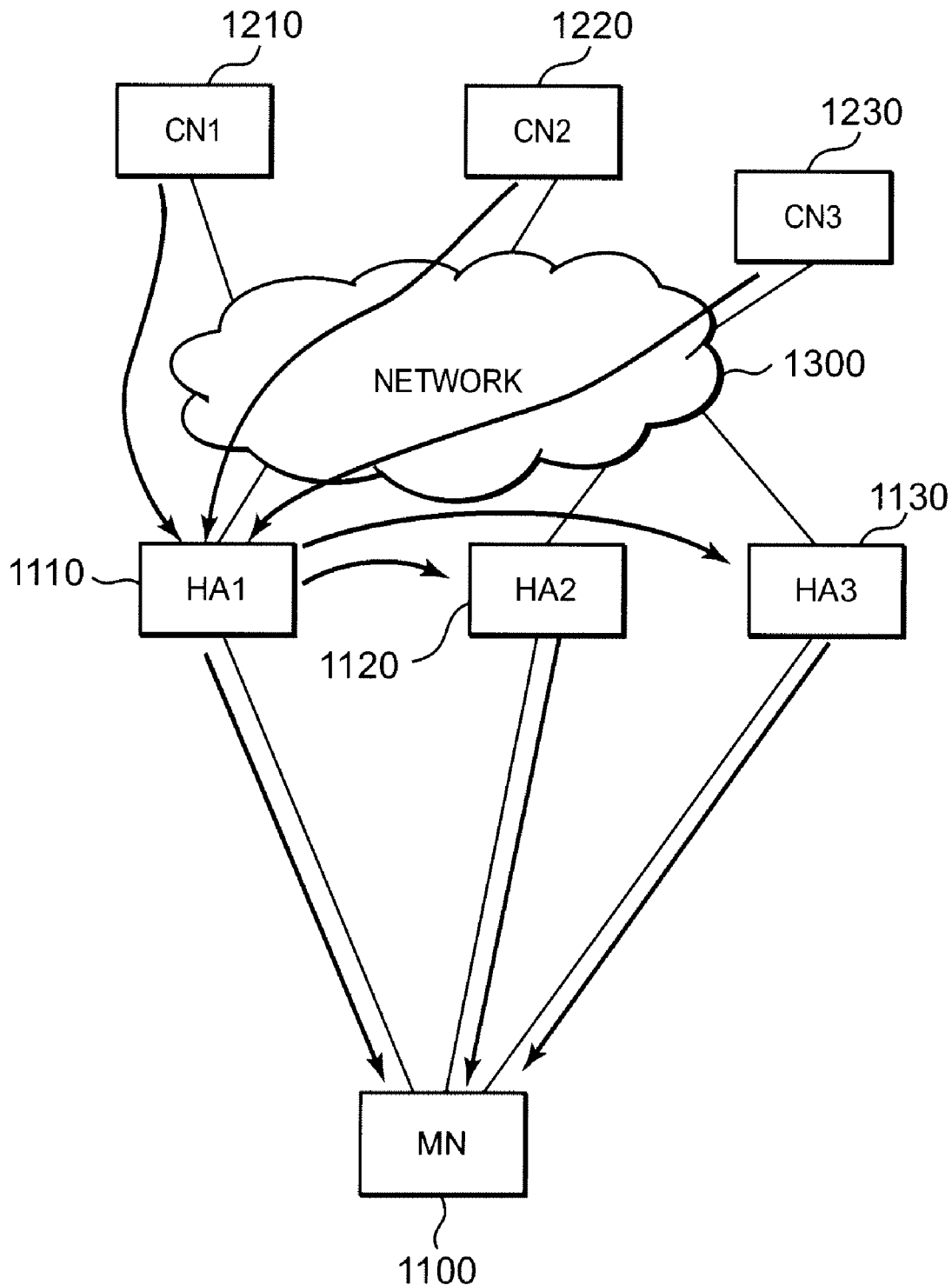
FIG. 7 is an illustration of one example of a state in which an MN fixes an HoA, to be used, to one in number, in a conventional technique.

In addition, by taking diverse factors related to communication into consideration, it is possible to derive the address patterns in consideration of the communication efficiency of the MN (100). Referring to FIG. 5, a description will be given hereinbelow of one example of an algorithm for registered address selection processing for enabling a pattern of addresses to be registered to be appropriately judged in consideration of the communication efficiency of the MN (100). FIG. 5 is a flow chart showing one example of the registered address selection processing according to the embodiment of the present invention. The flow chart of FIG. 5, showing one example of the registered address selection processing, indicates the detailed processing of the step S505 in FIG. 2. Moreover, FIG. 5 illustrates an processing example in a case in which the number of sessions is taken as a bases for the selection.

In the registered address selection processing shown in FIG. 5, the MN (100) first confirms the number of sessions passing through each HA and maintained currently (step S601). In this case, the number of sessions to be counted is the number of sessions for communication which pass through the HAs existing in the HNs with which the interfaces of the MN (100) are in connection. That is, it is the number of sessions in a case in which a CN sets an HoA (managed by an HA of an HN in currently direct connection) of the MN (100) as a packet destination for communication. Accordingly, the number of sessions to be counted excludes a session passing through an HA in the HN with which the interface thereof is not in connection and a session in the communication directly made with respect to an CN through the use of the route optimization.

Subsequently, the MN (100) conforms whether or not a plurality of interfaces connected to the same HN exist (step S602). The HA with which the plurality of interfaces are in connection can consider a session to be allocated to each of the interfaces. That is, for example, two interfaces are in connection with the HA1 (110) shown in FIG. 4B and the HA1 (110) can distribute the sessions passing through it to these two interfaces and, hence, the number of sessions can be considered as being substantially reduced by half. Therefore, if the confirmation result in the step S602 shows that a plurality of interfaces connected to the same HN exist, it is preferable that (the number of sessions of the HA in the same HN)/(the number of interfaces connected to this HN) is set as the number of effective sessions (step S603). On the other hand, with respect to the interface connected to the HN with which no further interface is in connection (for example, in FIG. 4B, the interface connected to the HA2 (120)), the number of sessions counted in the step S601 is used intact.

Although not shown in FIG. 5, for example, in a case in which the available bands in the respective interfaces are different from each other, for example, it is possible to make a more accurate comparison between the numbers of sessions on the respective HAs in a manner such that a value obtained by normalizing the number of sessions by the band is set as the number of effective sessions. For example, for the HA with which two or more interfaces are in connection, it is preferable to make a normalization using the sum of the bands available in these interfaces.

After the next calculation of the numbers of sessions (or the numbers of effective sessions) on the HAs in the respective HNs, with which the interfaces of the MN (100) are in connection, according to the above-mentioned operation, with respect to the HA having the smallest number of sessions, the MN (100) first deletes an address to be transferred to another HA from the binding information in a state associated with all the other addresses (step S604).

Moreover, with respect to the HA having the second-smallest number of sessions, the MN (100) deletes an address to be transferred to the HA, excluding the HA already undergoing the deletion processing, from the binding information in a state associated with all the other addresses (step S605). Still moreover, as indicated in a step S606, until the processing comes to an end with respect to all the HAs, the step S605 is implemented in the order of the HA having a smaller number of sessions to the HA having a larger number of sessions. For the HA processed later, a route for the transfer of a packet to another HA is given more securely.

In the case of associating the addresses set for the respective interfaces with the addresses of all the other interfaces, basically, a packet transfer route takes place according to a permutation $_NP_2$ path selecting a link between two arbitrary HAs of N HAs. The processing from the step S604 to the step S606 can be restated as the processing being conducted to calculate a combination $_NC_2$ where a packet returning route which causes a loop is deleted from this permutation $_NP_2$ path, and it is also appropriate to employ, for the processing of the steps S604 to S606, a combination calculation algorithm other than mentioned above.

In the steps S604 and S605, it is also possible that, in a case in which a plurality of HAs equal in the number of sessions to each other exist, other arbitrary factors (for example, the band (QoS band needed for each session, the utilization cost of each HA and the utilization cost of each interface and others) are referred to so as to differentiate the plurality of HAs equal in the number of sessions to each other or randomly select the HA to be processed earlier from the plurality of HAs.

In addition, since the number of sessions varies every hour, it is also appropriate that the number of sessions is checked repeatedly at an arbitrary timing and, on the basis of this check result, a change of the registration of the binding information on the MN (100) is made with respect to each HA. Still additionally, although in the steps S604 to S606 the processing is earlier made with respect to the smaller number of sessions, it is also acceptable that, for example, in a case in which a special HA exists which wants to secure a packet distributing route for some reason (or if a special HA exists which wants to centralize packets), the processing sequence is changed so that the processing is conducted at the end (or at the beginning).

Moreover, although in the description using FIG. 5 the number of sessions has been employed as a basis for the selection, also in a case in which reference is made to various types of factors including the available band of each interface, the band (QoS band) needed for each session, the number of sessions passing effectively through HA and utilization band thereof although the route optimization is made in conjunction with an CN, the utilization cost of each HA and the utilization cost of each interface and when reference is made to a combination of these factors, it is possible to obtain a registered address pattern which can suppress the occurrence of an infinite transfer loop.

The respective functional blocks used in the above description of the embodiment of the present invention are typically realized with an LSI (Large Scale Integration) which is an integrated circuit. It is also acceptable that these functional blocks are individually formed as one chip, or that a portion of or all of these functional blocks are formed as one chip. Although an LSI is taken in this case, it is sometimes referred to as an IC (Integrated Circuit), system LSI, super LSI or ultra LSI according to the level of integration.

Moreover, the technique for the formation of an integrated circuit is not limited to the LSI, but it is also realizable with a dedicated circuit or a general-purpose processor. After the manufacturing of the LSI, it is also acceptable to utilize an FPGA (Field Programmable Gate Array) which enables the programming or a reconfigurable processor which allows the reconfiguration of connections and setting of circuit cells in the interior of the LSI.

Still moreover, if a technique for the formation of an integrated circuit replaceable with the LSI appears owing to advance in semiconductor technology or a different technology derived therefrom, the functional blocks can naturally be integrated through the use of this technique. For example, a biotechnology or the like may be applicable.

INDUSTRIAL APPLICABILITY

The present invention provides an advantage of, in a case in which an MN has a plurality of interfaces, enabling the control to prevent an infinite transfer loop on the MN side while making use of the plurality of interfaces as simultaneously as possible, and it is applicable to a technical field related to packet communications and more particular to a technical field in which communications are made through the use of the mobile IPv6 and the multihoming technology.

The invention claimed is:

1. An address registration control device, which is mounted in a mobile node having a plurality of interfaces and having a home address allocated from each of a plurality of home networks, comprising:

home network connection detecting means for detecting whether or not two or more interfaces of said plurality of interfaces are connected to the home networks different from each other;

abnormal transfer measures confirming means for, when said home network connection detecting means detects the fact that the two or more interfaces are connected to the different home networks, confirming whether or not a home agent existing in each of the different home networks operates an abnormal transfer measures function to avoid the occurrence of a transfer loop where a packet transfer is repeatedly made in conjunction with a different home agent;

registration control condition deciding means for, when said abnormal transfer measures confirming means confirms the presence of a home agent which does not operate said abnormal transfer measures function, determining that said mobile node avoids the occurrence of the transfer loop; and registration control means for, when said registration control condition deciding means determines that said mobile node avoids the occurrence of the transfer loop, deriving a combination of addresses to be registered for each of said home agents and carrying out control so that the derived address combination is registered as information to be referred to by said home agent at the transfer of a packet addressed to said mobile node.

2. The address registration control device according to claim 1, wherein said abnormal transfer measures confirming means is arranged to refer to at least one of an inquiry at the home agent existing in each of the different home networks, information notified from the home agent existing in each of the different home networks and an information home agent previously stored in said mobile node for confirming whether or not said home agent operates said abnormal transfer measures function.

3. The address registration control device according to claim 1, wherein said registration control condition deciding means is arranged to determine that said mobile node avoids the occurrence of the transfer loop in a case in which two or more interfaces are connected to said home network in which the home agent which does not operate said abnormal transfer measures function exists.

4. The address registration control device according to claim 3, wherein said registration control condition deciding means is arranged to regard a plurality of interfaces connected to the same home network as one interface being connected to said home network.

5. The address registration control device according to claim 1, wherein said registration control means is arranged to derive the address combination for the avoidance of the transfer loop on the basis of one of the number of sessions, an available band of each of the interfaces, a band needed for each of the sessions, a utilization cost of each HA and a utilization cost of each interface or a combination thereof.

6. The address registration control device according to claim 1, wherein said registration control means is arranged to calculate a combination of links making a connection of two HAs of said home agents existing in each of the different home networks to derive the address combination for the avoidance of the transfer loop.

\* \* \* \* \*